(12) United States Patent
Zhao et al.

(10) Patent No.: US 10,013,617 B2
(45) Date of Patent: Jul. 3, 2018

(54) SNOW COVERED PATH OF TRAVEL SURFACE CONDITION DETECTION

(71) Applicant: GM GLOBAL TECHNOLOGY OPERATIONS LLC, Detroit, MI (US)

(72) Inventors: Qingrong Zhao, Madison Heights, MI (US); Jinsong Wang, Troy, MI (US); Qi Zhang, Sterling Heights, MI (US); Bakhtiar B. Litkouhi, Washington, MI (US); Wende Zhang, Troy, MI (US)

(73) Assignee: GM Global Technology Operations, Detroit, MI (US)

( * ) Notice: Subject to any disclaimer, the term of this patent is extended or adjusted under 35 U.S.C. 154(b) by 238 days.

(21) Appl. No.: 14/957,968

(22) Filed: Dec. 3, 2015

(65) Prior Publication Data

US 2017/0161571 A1    Jun. 8, 2017

(51) Int. Cl.

| G06K 9/00 | (2006.01) |
|---|---|
| B60Q 9/00 | (2006.01) |
| B60R 1/00 | (2006.01) |
| H04N 7/18 | (2006.01) |
| G06K 9/46 | (2006.01) |
| B60R 11/04 | (2006.01) |

(52) U.S. Cl.
CPC .......... G06K 9/00798 (2013.01); B60Q 9/00 (2013.01); B60R 1/00 (2013.01); B60R 11/04 (2013.01); G06K 9/00791 (2013.01); G06K 9/4661 (2013.01); H04N 7/181 (2013.01); *B60R 2300/8053* (2013.01)

(58) Field of Classification Search
CPC ............ G06K 9/00798; G06K 9/4661; G06K 9/00791; H04N 7/181; B60R 1/00; B60R 2300/8053; B60Q 9/00
See application file for complete search history.

(56) References Cited

U.S. PATENT DOCUMENTS

| 2011/0109448 | A1* | 5/2011 | Browne | B60Q 9/00 |
| | | | | 340/438 |
| 2013/0015946 | A1* | 1/2013 | Lau | G07C 9/00 |
| | | | | 340/5.2 |
| 2014/0049405 | A1* | 2/2014 | Breuer | B60Q 9/00 |
| | | | | 340/905 |
| 2016/0096477 | A1* | 4/2016 | Biemer | H04N 5/2258 |
| | | | | 348/148 |
| 2016/0239973 | A1* | 8/2016 | Tanaka | G06T 11/00 |
| 2017/0096144 | A1* | 4/2017 | Elie | B60W 10/18 |

* cited by examiner

*Primary Examiner* — Tung Vo
*Assistant Examiner* — Joseph Becker
(74) *Attorney, Agent, or Firm* — Quinn IP Law

(57) ABSTRACT

A method for determining a snow covered surface condition of a path of travel. A beam of light is emitted at a surface of the path of travel by a light emitting source. An image of a path of travel surface is captured by an image capture device. The image capture device is mounted on the vehicle and captures an image in a downward direction. The captured image captures the beam of light emitted on the path of travel surface. Analyzing a subsurface scattering of the light generated on the path of travel surface by a processor. A determination is made whether snow is present on the path of travel. A snow covered path of travel surface signal is generated in response to the identification of snow on the path of travel.

28 Claims, 10 Drawing Sheets

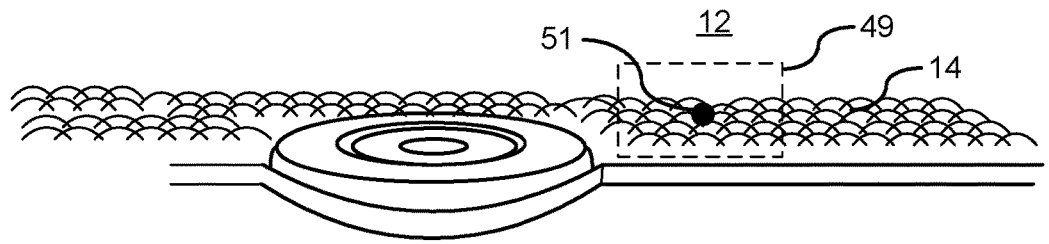
Fig. 6
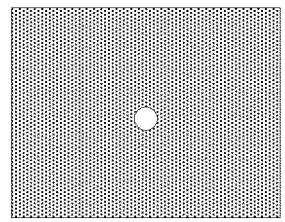  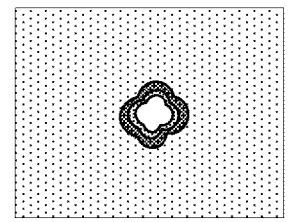
Fig. 7a                Fig. 7b
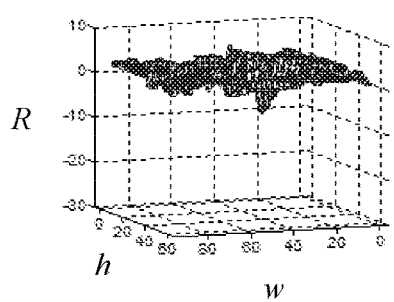  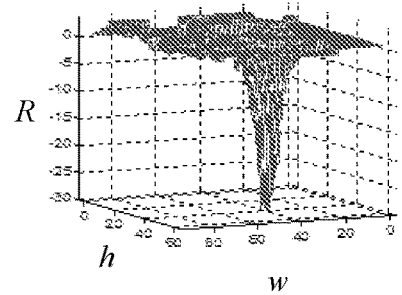
Fig. 8a                Fig. 8b

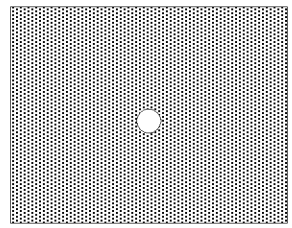
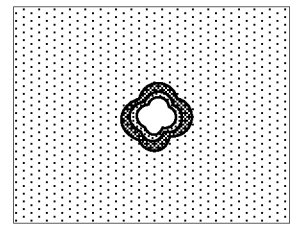
Fig. 11aFig. 11b
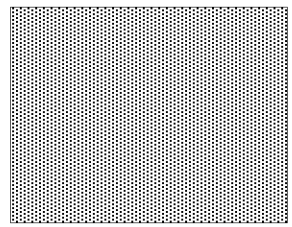
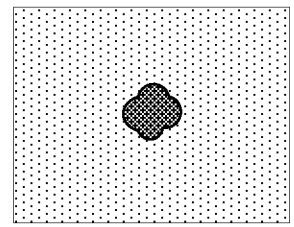
Fig. 12aFig. 12b
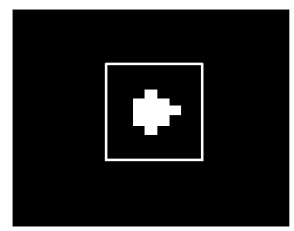
Fig. 13aFig. 13b

SNOW COVERED PATH OF TRAVEL SURFACE CONDITION DETECTION

BACKGROUND OF INVENTION

An embodiment relates generally to detection of a snow covered path of travel surface using light subsurface scattering.

Precipitation on a driving surface causes several different issues for a vehicle or a person traveling along a path of travel. For example, snow on a road reduces the coefficient of friction between the tires of the vehicle and the surface of the road resulting in vehicle stability issues. Detection of snow on a road of travel is typically determined by a host vehicle sensing for snow on the road utilizing some sensing operation which occurs when the snow is already impacting the vehicle operation such as detecting wheel slip. As a result, the vehicle must monitor its own operating conditions (e.g., wheel slip) against dry pavement operating conditions for determining whether snow is present. As a result, such systems may wait for such a condition to occur or may introduce excitations to the vehicle for determining whether the condition is present (e.g., generating sudden acceleration to the driven wheels for invoking wheel slip if the precipitation is present).

Another advantage is that the technique described herein can attenuate the influence of ambient lighting condition since an active lighting source used, and at the same time, false detection of white colored dry ground such as salt corrupted dry road in winter can be eliminated.

SUMMARY OF INVENTION

An advantage of an embodiment is the detection of snow on a path of travel using a vision-based imaging device paired with a concentrated lighting source such as a laser LED that identifies snow based on subsurface scattering of light, which generates a broad blurring of diffused lighting over a snow-covered road in contrast to a relatively small light spot on non-snow covered path of travel surfaces such as dry and wet roads. The technique described herein requires no excitations from the vehicle or driver for initiating a determination of whether precipitation is present. Rather, snow is determined in response to analyzing light scattered in the surface of the snow on the path of travel. The technique captures an image that includes the light beam scattered on the surface. An RGB image is converted to Lab space. Either Laplacian of Gaussian (LOG) filtering or binary conversion is applied to the Lab space image to help capture the broad blurring pattern of diffused lighting on a snow-covered surface. If a broad blurring exists, the LOG filter response would generate a large peak at the location of a broad blurring area in contrast to a relatively flat filter response on non-snow covered path of travel surfaces, such as dry and wet roads. Alternatively, a mean-variance analysis of the binary image can also identify snow by having mean ratio and variance ratio larger than 1 between light scattered region and the total area, in contrast to ratio values of being close to 1 on non-snow covered path of travel surfaces, such as dry and wet roads. A trained classifier is formed and is implemented online within the vehicle. A similar process is used within the vehicle to capture and process the light beam. A determination is made whether snow is present on the path of travel surface as function of the online classifier implemented within the vehicle for real time detection of snow on the path of travel based on active monitoring of the path of travel surface.

An embodiment contemplates a method for determining a snow covered surface condition of a path of travel. A beam of light is emitted, by a light emitting source, at a surface of the path of travel. An image of a path of travel surface is captured by an image capture device. The image capture device is mounted on the vehicle and captures an image in a downward direction. The captured image captures the beam of light emitted on the path of travel surface. A subsurface scattering of the light generated on the path of travel surface is analyzed by a processor. A determination is made whether snow is present on the path of travel. A snow covered path of travel surface signal is generated in response to the identification of snow on the path of travel.

BRIEF DESCRIPTION OF DRAWINGS

FIG. 6 illustrates an exemplary image captured by the image capture device.

FIG. 7a represents a RGB image of the region of interest for a dry surface.

FIG. 7b represents a RGB image of the region of interest for a snow covered surface.

FIG. 8a is an exemplary filter response for a dry surface.

FIG. 8b is an exemplary filter response for a snow covered surface.

FIG. 11a represents an exemplary RGB image of the region of interest of a dry surface.

FIG. 11b represents an exemplary RGB image of the region of interest of a snow-covered surface.

FIG. 12a represents exemplary responses for a dry road surface in a Lab color space.

FIG. 12b represents exemplary responses for a snow covered road surface in a Lab color space.

FIG. 13a represents an exemplary binary converted image for a dry surface.

FIG. 13b represents an exemplary binary converted image for a snow covered surface.

DETAILED DESCRIPTION

Figure 1:
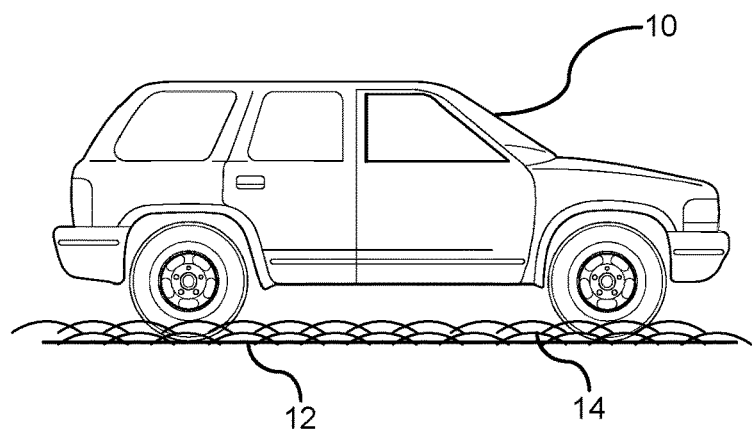
FIG. 1 an exemplary perspective view of a vehicle traveling on a snow covered surface.

There is shown in FIG. 1, a vehicle 10 traveling along a vehicle path of travel 12, such as a road. It should be understood that the term path of travel may include any surface traveled by a motorized vehicle, bicycle, or pedestrian. For illustrative purposes, the term road will be used as the path of travel; however, it is understood that the term path of travel is not limited to a road traveled by vehicles and the system and technique described herein may be implemented on moving entities as well as fixed entities. Snow 14 disposed on the vehicle road 12 causes a slippery condition as the tires rotate over the snow covered surface of the vehicle road 12. It is often advantageous to know when the vehicle will be traveling along a snow covered vehicle road 12 so that issues resulting from snow, such as loss of traction.

Snow 14 disposed on the vehicle road 12 lowers the coefficient of friction between the vehicle tires and the vehicle road 12. As a result, traction between the vehicle tires and the vehicle road 12 is lowered. Loss of traction can be mitigated by various mitigation techniques that include, but are not limited to, warning the driver to lower the vehicle speed to one that is conducive to the environmental conditions; actuating automatic application of the vehicle brake using a very low braking force to minimize the precipitation formed on the braking surfaces of the braking components; deactivation or restricting the activation of cruise control functionality while precipitation is detected; or notification to the driver to maintain a greater stopping distance to a lead vehicle. It should be understood that the embodiments described herein can be applied to other types of systems aside from automobiles where detection of a snow covered road surface condition is desired. Examples of vehicles that are other than automobiles that can utilize this system include, but are not limited to, rail systems, planes, off-road sport vehicles, robotic vehicles, motorcycles, bicycles, farm equipment, and construction equipment.

Figure 3:
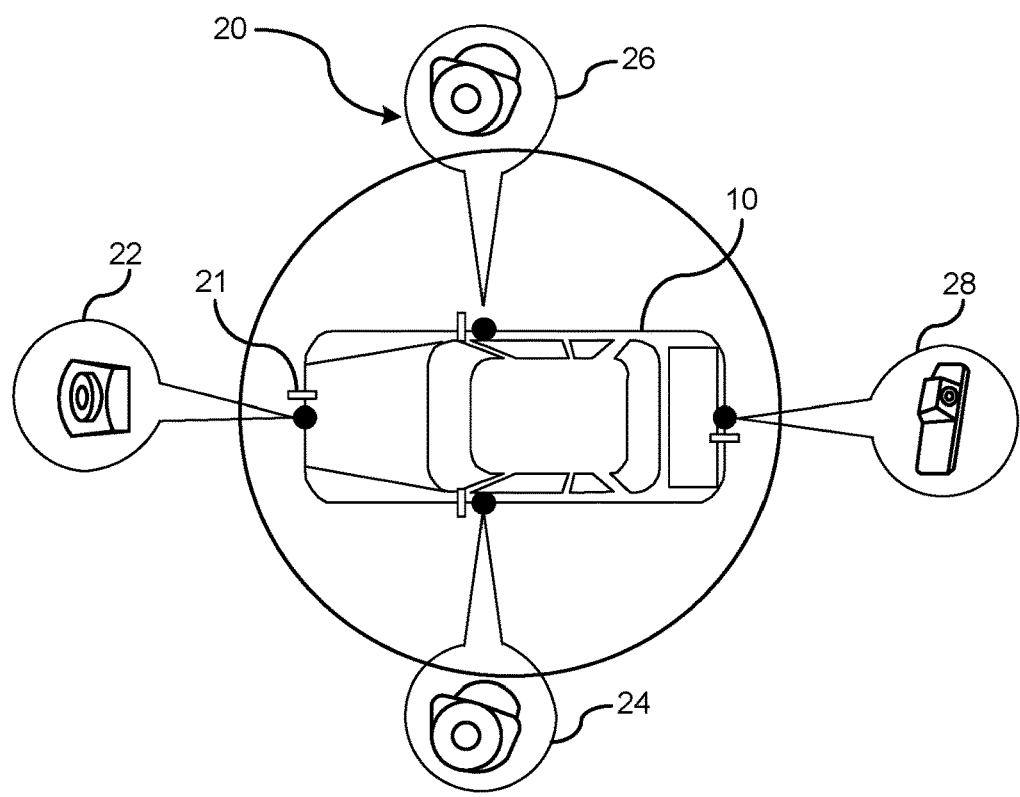
FIG. 3 is an exemplary perspective view of a vehicle surround having surround view coverage.
Figure 2:
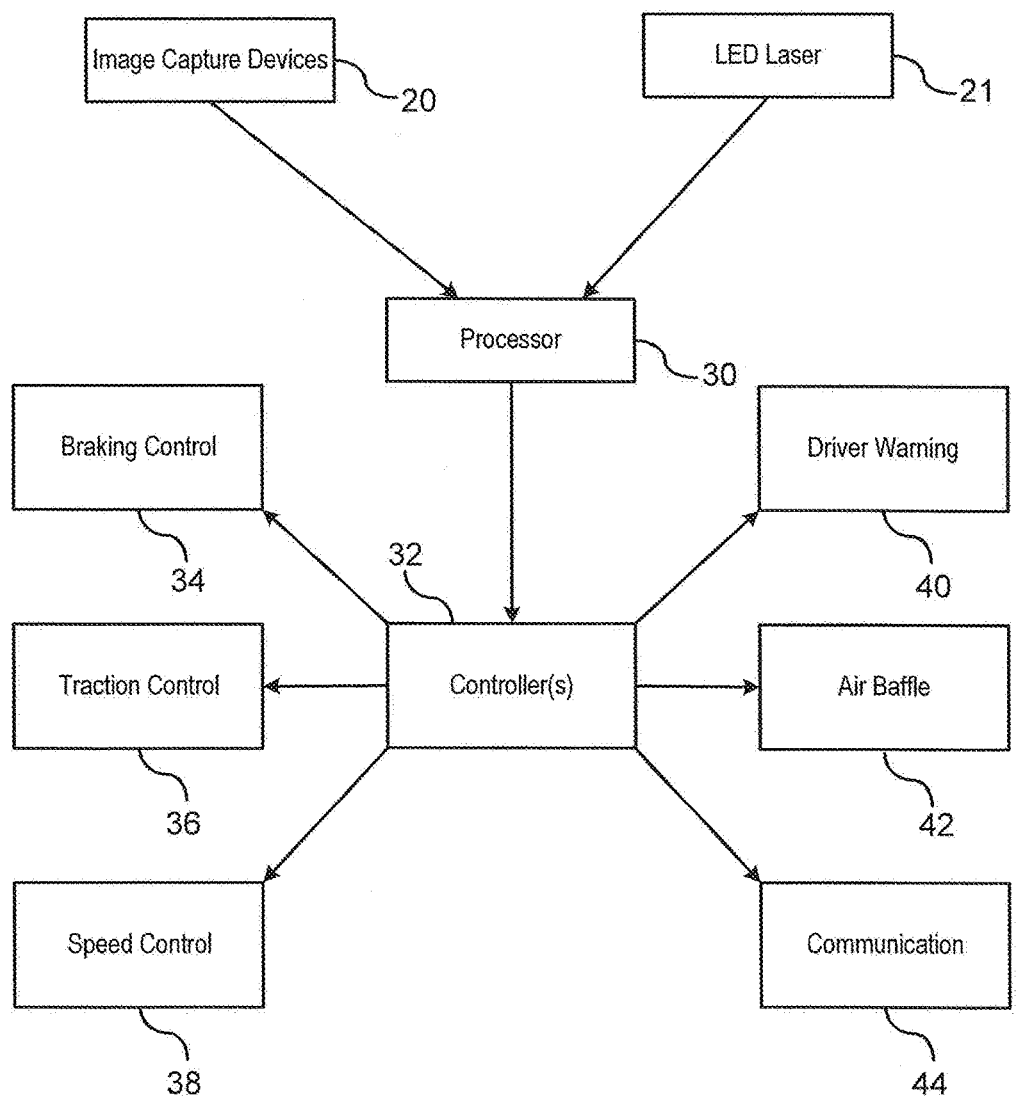
FIG. 2 illustrates a block diagram of a snow covered path of travel surface detection system.

FIG. 2 illustrates a block diagram of a snow covered road surface detection system. A plurality of vehicle-based image capture devices 20 and light emitting devices including, but not limited to, LED lasers are mounted on the vehicle for capturing images around the vehicle that will assist in detecting snow. Subsurface scattering of light can happen to various lighting sources (e.g., flash light, Laser LED). In order to differentiate snow from other types of road conditions, a concentrated source of light is preferably such as a laser LED is preferably used, which can generate subsurface scattering on snow, but also keep a concentrated light spot on other types of roads such as dry or wet roads. The plurality of vehicle based image capture devices 20 and light emitting devices 21 may be mounted on the front, rear, and sides of the vehicle. FIG. 3 illustrates an exemplary 360 degree surround view coverage for detecting objects around the vehicle. Each of the image-based capture devices are cooperatively used to detect and identify objects on each side of the vehicle. The image-based capture devices 20 include, but are not limited to, a front view camera 22 is mounted to a front of the vehicle capturing image forward and partially to the sides of the vehicle. A driver's side camera 24 captures images on the driver side of the vehicle. A passenger's side camera 26 captures images on the passenger side of the vehicle. A rearward facing camera 28 captures images rearward and to the side of the vehicle.

Figure 4:
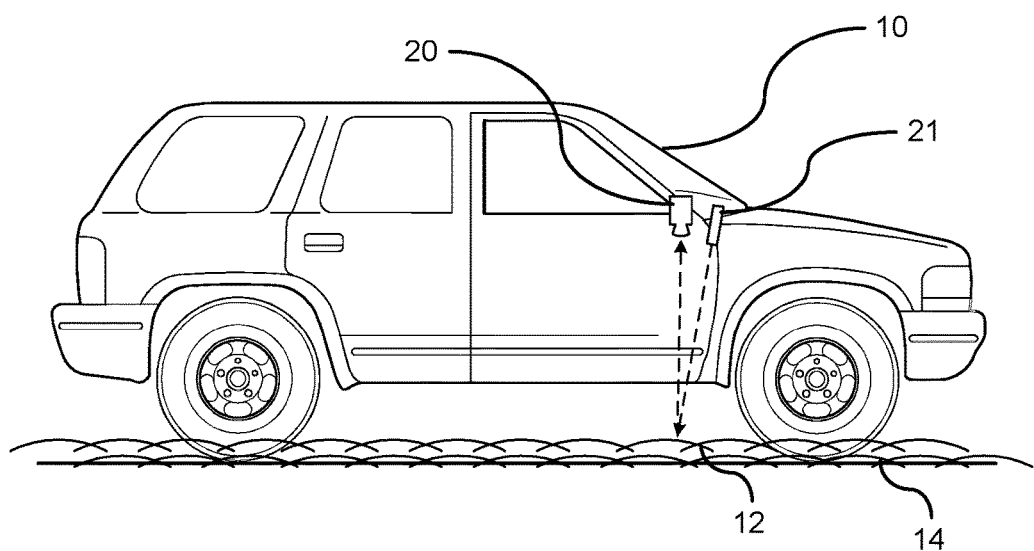
FIG. 4 is an exemplary perspective view of a vehicle including an image capture device and light emitting device.

FIG. 4 illustrates a perspective view of the vehicle 10 driving on the snow covered road surface. The light emitting device 21 emits a light beam at the road surface 12. The light emitted at the road surface is captured by a respective vehicle image capture device. The light beam captured by the image capture device is analyzed for determining whether snow 14 is present on the road surface. The technique as used herein utilizes a subsurface scattering analysis of the light for determining whether snow is present. Subsurface scattering is a process where light penetrates a surface of a translucent object (e.g., snow) and is scattered through the interaction with the material. The light exits the snow at different points. The light will generally penetrate the surface of the snow and will be reflected a number of times at irregular angles inside the snow before passing back out of the snow at an angle other than a respective angle it would have if it had been directly reflected off the surface. Snow is composed of relatively loose packed ice crystals. The loosely packed ice crystals make up as little as 5% total of a spatial volume for a region of snow. The ice crystals in the snow generate subsurface scattering of the light. Light generated on a dry surface (e.g., a laser pointer shining on a dry road) will have essentially no scattering of the beam and shows a relatively small light spot that is substantially uniform in comparison to a snow-covered surface. The snow-covered surface generates a broad blurring of diffused lighting as a result of the ice crystals scattering the light through the snow. Analysis of the light on the surface uses an image conversion to a Lab color space. This involves transforming a RGB image (i.e., red-green-blue image) to a Lab color space for better detecting the broad blurring pattern of color changes with the light as the light signal scatters throughout the subsurface of the snow. Lab space includes various components having a dimension L for lightness and "A" and "B" for the color-opponent dimensions. The Lab color space includes all perceivable colors, which means that its scope exceeds those of the RGB color models. An important attribute of a Lab model is device independence where colors are defined independent of their nature of creation. The Lab color space is used when graphics for print have to be converted from RGB. While the space itself is a three-dimensional real number space, which can contain infinite possible representations of colors, when used in reality, the space is usually mapped onto a three-dimensional integer space for device-independent digital representation. In the embodiments described herein, the color channels are represented as follows: A lightness component is represented along the L-axis, a green to red component is represented along the A-axis, and a blue to yellow component is represented along the B-axis.

Referring again to FIG. 2, a processor 30 processes the images captured by the image capture devices 20. The processor 30 analyzes images and data to determine whether snow is present on the road surface in an immediate vicinity of the vehicle. Once the image is captured, the processor 30 identifies a region of interest for determining whether snow is present based on the light scattering within the region of interest. The region of interest may include a square shape, a circular shape, or other shape depending on the light source and problem formulation. The processor 30 may be part of an existing system, such as traction control system or other system, or can be a standalone processor dedicated to analyzing data from the image capture devices 20.

The processor 30 may be coupled to one or more output devices such as a controller 32 for initiating or actuating a control action if snow is found in the region of interest. One or more countermeasures may be actuated for mitigating the effect that the snow may have on the operation of the vehicle.

The controller 32 may be part of the vehicle subsystem or may be used to enable a vehicle subsystem for countering the effects of the snow. For example, in response to a determination that the road is snow covered, the controller 32 may enable an electrical or electro-hydraulic braking system 34 or similar where a braking strategy is readied in the event that traction loss occurs. In addition to preparing a braking strategy, the braking system may autonomously apply a light braking force, without awareness to the driver, to remove snow from the vehicle brakes once the vehicle enters the snow. Removal of snow build-up from the wheels and brakes as a result of melted snow maintains an expected coefficient of friction between the vehicle brake actuators and the braking surface of the wheels when braking by the driver is manually applied.

The controller 32 may control a traction control system 36 which distributes power individually to each respective wheel for reducing wheel slip by a respective wheel when snow is detected on the road surface.

The controller 32 may control a cruise control system 38 which can deactivate cruise control or restrict the activation of cruise control when snow is detected on the road surface.

The controller 32 may control a driver information system 40 for providing warnings to the driver of the vehicle concerning snow that is detected on the vehicle road. Such a warning actuated by the controller 32 may alert the driver to the approaching snow on the road surface and may recommend that the driver lower the vehicle speed to a speed that is conducive to the current environmental conditions, or the controller 32 may actuate a warning to maintain a safe driving distance to the vehicle forward of the driven vehicle. It should be understood that the controller 32, as described herein, may include one or more controllers that control an individual function or may control a combination of functions.

The controller 32 may further control the actuation of automatically opening and closing air baffles 42 for preventing snow ingestion into an engine of the vehicle. Under such conditions, the controller 32 automatically actuates the closing of the air baffles 42 when snow is detected to be present on the road surface in front of the vehicle and may re-open the air baffles when snow is determined to no longer be present on the road surface.

The controller 32 may further control the actuation of a wireless communication device 44 for autonomously communicating the snow covered pavement condition to other vehicles utilizing a vehicle-to-vehicle or vehicle-to-infrastructure communication system.

The controller may further provide the snow covered road surface signal alerts to a driver of the vehicle warning against a use of automated features that include, but are not limited to, Adaptive Cruise Control, Lane Following, Lane Change, Evasive/Assist Steering Maneuver and Automated Emergency Braking.

The advantage of the techniques described herein is that no excitations are required from the vehicle or driver for initiating a determination of whether snow is present. That is, prior techniques require some considerable excitation by the vehicle whether by way of a braking maneuver, increased acceleration, steering maneuver so as for surface snow detection. Based on the response (e.g., wheel slip, yawing), such a technique determines whether the vehicle is currently driving on snow. In contrast, the techniques described herein do not require driver excitations for determining snow on the road. In addition, the technique described herein can attenuate the influence of ambient lighting condition since an active lighting source used, and at the same time, false detection of white colored dry ground such as salt corrupted dry road in winter can be eliminated. A common disadvantage for camera based solution is very sensitive to ambient light. There are many camera-based snow detection approach available, however such approaches purely rely on camera image analysis and can be very sensitive to ambient lighting change without active lighting and may also produce an incorrect decision for white color dry road. The technique of subsurface scattering with a laser lighting source described herein can eliminate the chance of wrongly identifying a relatively white color dry surface as snow-covered surface.

Figure 5:
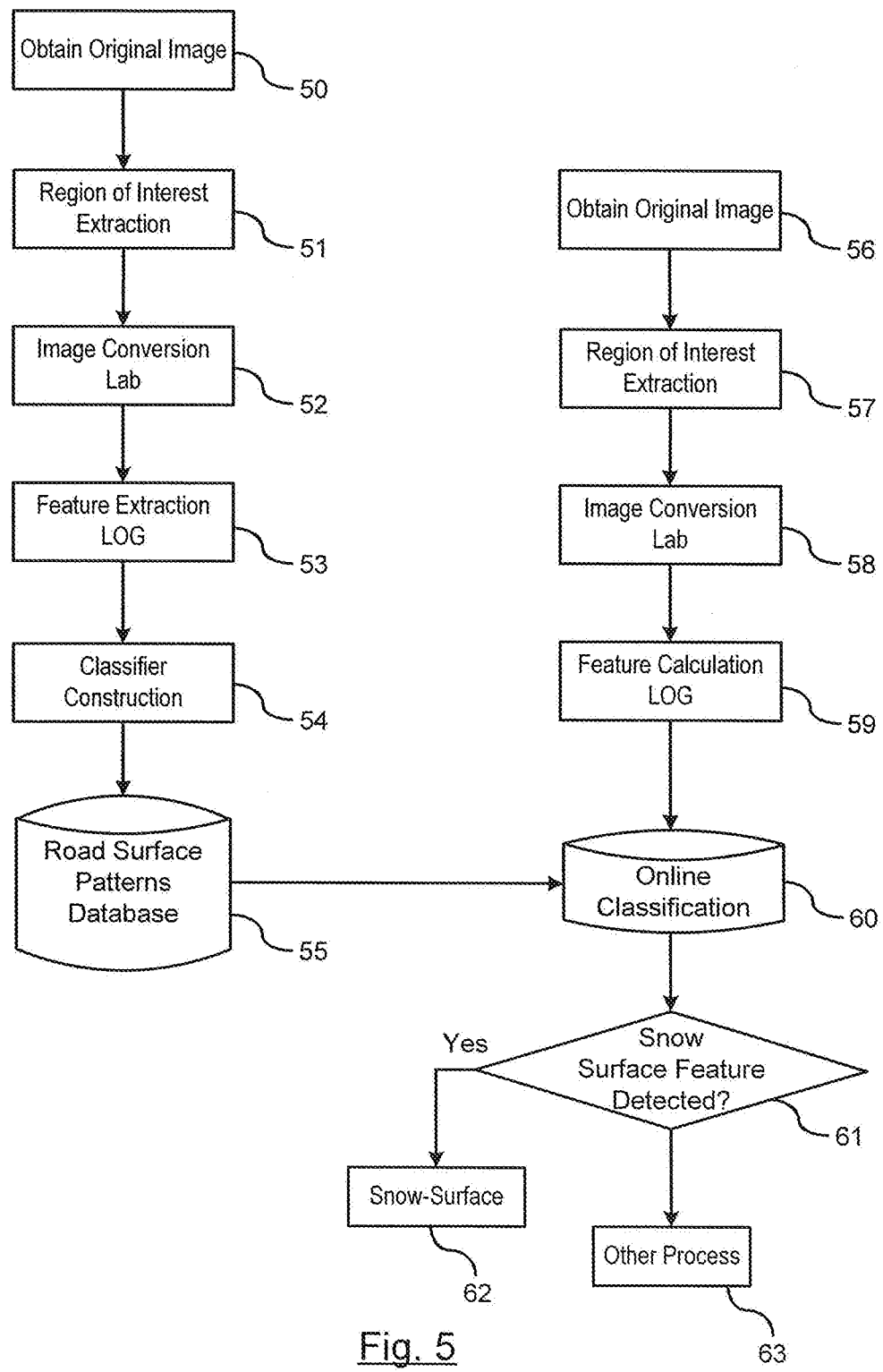
FIG. 5 illustrates a flowchart of a method for detecting a snow covered surface.

FIG. 5 illustrates a flowchart of a first technique for detecting the snow covered road surface. Steps 50-55 represent a training phase to construct a road surface pattern database, whereas steps 55-64 represent an online classifier used in the vehicle for determining whether snow is on the road surface.

In step 50, an image is obtained of a region juxtaposed to a respective side of the vehicle. The image is analyzed for obtaining scene information where light scattering characteristics in the scene may be analyzed for determining whether snow is present in the image. FIG. 6 illustrates an image captured by the image capture device that is mounted on the side of the vehicle. The image may be processed so that a downward view is captured (i.e., looking down at the road of travel). A lens utilized by a respective image capture device may utilize a fisheye lens where a wide field-of-view is captured (e.g., 180 degrees). Image processing may also be applied to change the pose of the camera such that the pose, as viewed in the image, is directed downward. For example, if an image from one of the respective side cameras is utilized, then a respective location in the image, although not the focal point of the camera pose, may utilized for generating a virtual pose which renders the scene as if the camera where looking directly downward capturing the road of travel 12 and the snow 14. To change the pose, a virtual camera model may be used with the captured image such that a virtual pose is utilized to reorient the image so that a virtual image is generated as if the camera is reoriented and facing a different direction (e.g., facing directly downward). Reorienting the image to generate the virtual image includes identifying the virtual pose and mapping of each virtual point on the virtual image to a corresponding point on the real image. The term pose as used herein refers to a camera viewing angle (whether real camera or virtual camera) of a camera location defined by the camera coordinates and the orientation of a camera z-axis. The term virtual camera as used herein is referred to a simulated camera with simulated camera model parameters and simulated imaging surface, in addition to a simulated camera pose. Camera modeling as performed by the processor is described herein as obtaining a virtual image which is a synthesized image of the scene using the virtual camera modeling.

Referring again to FIG. 5, in step 51, a region of interest is identified from the real image or virtual image. This technique localizes the region of interest which identifies a respective region where the laser beam is emitted on the road surface relative to the vehicle so that if snow is detected in this region, then assumptions can be made that the vehicle is traveling on snow. As shown in FIG. 6, the exemplary region identified by 49 represents region of interest in the image and element 51 represents light emitted by the light emitting device on the snow 14 of the road 12.

Referring again to FIG. 5, in step 52, image conversion is performed utilizing a Lab color model. The image transformed from RGB into Lab color space readily captures relevant color information of the light beam in the image for analysis by isolating the influence of environmental noise such as lighting and salted surfaces, which enhances detection reliability.

In step 53, feature extraction is applied on the converted image (e.g., Lab image) utilizing a respective filtering technique. Preferably, the feature extraction utilizes a Laplacian of Gaussian (LOG) filtering technique. The LOG operator calculates a second spatial derivative of the image. The filter highlights regions of rapid intensity change and therefore can be used for edge detection. Various filters with different scales (e.g., $\sigma_2=\{2\sqrt{2}, 3\sqrt{2}4, 6, 6\sqrt{2}, 12\}$) can be used to filter "A" and "B" channel images of each frame, respectively. For example, if 6 LOG filters are used on each image, then a maximum response the region of interest is considered a feature, thereby resulting in 12 features in a feature set. It should be understood that the technique herein may filtering other than Laplacian of Gaussian (LOG) filtering.

FIG. 7a represents the RGB image of the region of interest for a dry surface. As shown in FIG. 7a, the respective beam of light is captured as a substantially defined point having essentially a uniform color. In contrast, FIG. 7b represents the RGB image of the region of interest for a snow-covered surface. The respective beam of light emitted onto the snow-covered surface is scattered. The respective beam of light includes colors transitions that change from a center of the light to a radially outward scattering of the beam of light in the snow.

FIGS. 8a and 8b represent exemplary filter responses after the LOG filter is applied to Lab images in the region of interest in the "A" channel. That is, respective colors may be focused on such that color changes with the light as the light signal scatters throughout the subsurface of the snow can be detected, thereby identifying those color component changes that are indicative of light scattering in snow. In this exemplary case, color images from green to red are the focus of analysis in the Lab color space. The LOG filter is applied to Lab images with pixel values from "A" channel. FIGS. 8a and 8b represent three-dimensional graphs where the filter response (R) is represented along the z-axis, the image height is represented along the x-axis, and the image width is represented along the y-axis. As shown in FIG. 8a, the filter response is substantially zero for the dry surface. In contrast, FIG. 8b illustrates snow that is detected in the filter image due to the intensity change around a larger light image shape. As a result, the filter response for an image of snow-covered surface is substantially greater than zero as shown in FIG. 8b.

Figure 9:
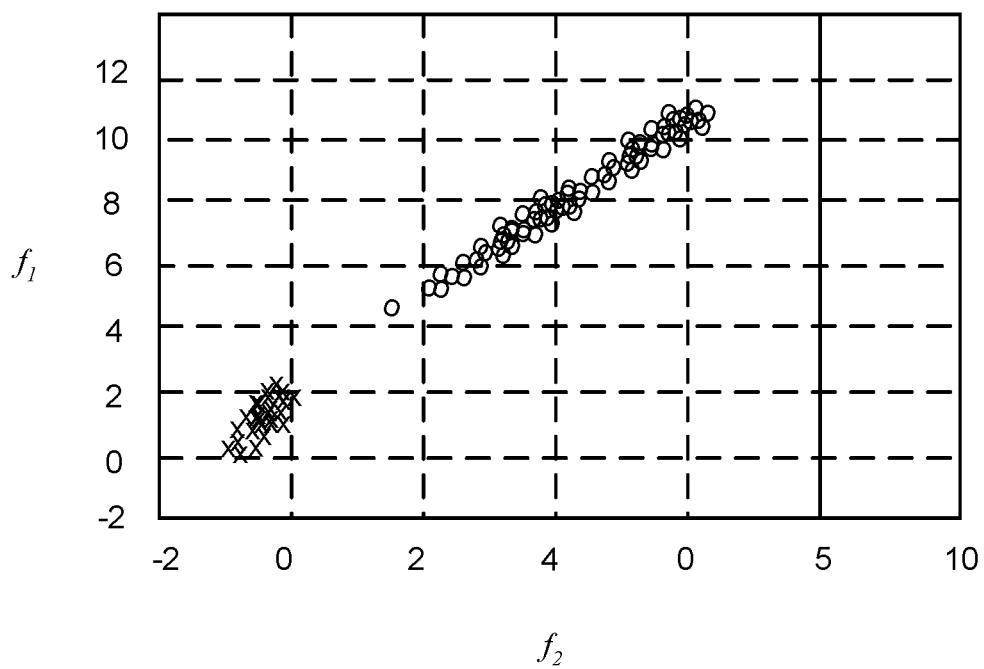
FIG. 9 represents an exemplary feature space characterizing snow-covered and non-snow covered surfaces for classifier construction.

Referring again to FIG. 5, in step 54, a classifier is constructed based on the results in step 53. Respective features representing sample distributions are plotted in feature space. FIG. 9 represents an exemplary feature space characterizing snow-covered and non-snow covered surfaces used to construct the classifier. An x-axis represents a first feature and the y-axis represents a second feature. The first feature is an exemplary maximum filter response after the LOG filter with a scale of $\sigma=4$ is applied to a Lab image with pixel values from "A" channel. The second feature is an exemplary maximum filter response after the LOG filter with a scale of $\sigma=12$ is applied to a Lab image with pixel values from "A" channel. The symbols "o" represents snow present in the image whereas symbol "x" represents a dry surface. The trained classifier is used to identify a separation plane can be used to distinguish between snow and the ideal dry surface. If a snow exists, then a large peak value (i.e., substantially greater than zero) can be detected on the image.

In step 55, a classifier is trained utilizing the feature set extracted in step 53 to build a road surface patterns database, which contains pre-stored data associated with the feature set representing typical patterns of the various road surface conditions. Once the road surface patterns database is constructed, the road surface patterns database can be implemented online in a vehicle in production.

Step 56-59 relate to real-time processing of captured images in analyzing images in the vehicle. These respective steps are the same as steps 50-53 as described above, except that the processing relates to analyzing real-time images as opposed to training the classifier.

In step 59, a set of features extracted from step 53 are calculated as a function of the LOG filtering based on the respective feature(s) targeted, Lab space channel, and scales applied.

In step 60, the set of features calculated in step 59 are provided to an online classifier to determine whether snow is present in the region of interest by comparing the calculated feature values with the pre-stored data associated with the same feature set in the road surface pattern database.

In step 61, if the determination of snow being present on the road surface is confirmed, then the routine proceeds to step 62; otherwise, the routine proceeds to step 63.

In step 62, in response to a determination that snow is present on the road surface, a snow covered surface indicator flag is set indicating that snow is present in the region of interest. A signal is communicated to a controller where various vehicle operations as described earlier can be actuated that include, but are not limited to, braking control, traction control, speed control, steering control, driver warning, air baffle control, and vehicle to vehicle communication.

If the determination was confirmed in step 61 that snow is not present in the region of interest, then the routine proceeds to step 63 where other additional techniques may be utilized to verify whether snow is present or not.

Figure 10:
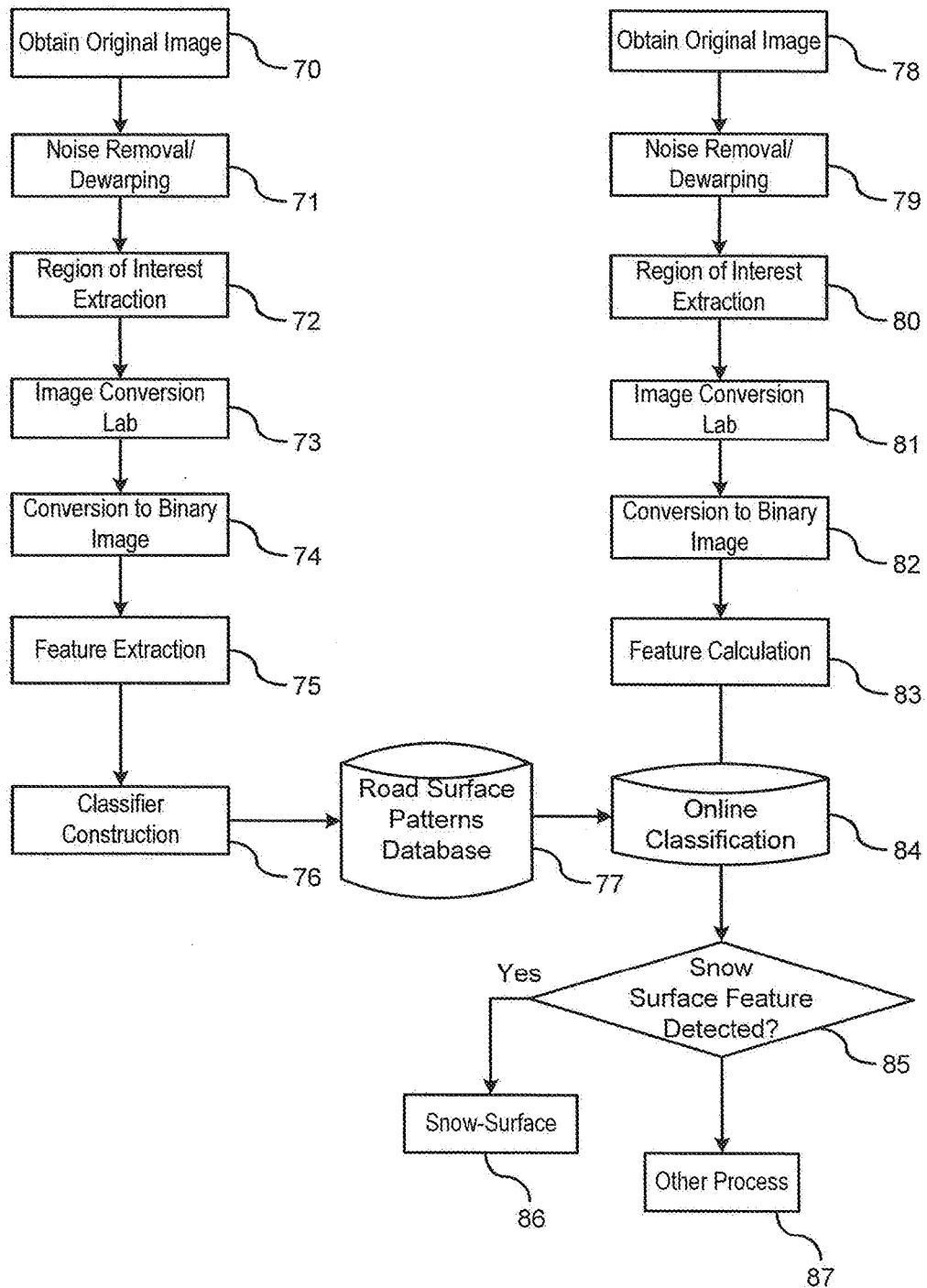
FIG. 10 illustrates a flowchart of a second technique for detecting the snow covered path of travel surface.

FIG. 10 illustrates a flowchart of a second technique for detecting the snow covered road surface. Steps 50-55 represent a training phase to construct a road surface pattern database, wherein as steps 55-63 represent online determination of snow on the road surface in a vehicle.

In step 70, an image is obtained of region juxtaposed to a respective side of the vehicle. The image is analyzed for obtaining scene information where the captured light beam in the scene may be analyzed for determining whether snow is present in the image. Image capture and image processing as described earlier may be used herein.

In step 71, noise removal and/or de-warping techniques are applied to the input image.

In step 72, a region of interest is identified from the real image or virtual image. This technique localizes the region of interest which identifies a respective region where the light beam is emitted on the road surface relative to the vehicle so that if snow is detected in this region, then assumptions can be made that the vehicle is traveling on snow In step 73, image conversion is performed utilizing Lab color model. The image transformed from RGB into Lab color space captures relevant color information of the light image for analysis by isolating the influence environmental of noise such as lighting and salted surfaces, which enhances detection reliability.

In step 74, binary conversion is applied to the Lab converted image. The binary conversion results in a patterned structure of the snow analysis in the image when snow is present, while a non-presence of snow in the LAB converted image has no pattern on a non-snow surface. A mean ratio and a variance ratio between the light scattered region and a total region of interest on the binary converted image include values larger than 1 in contrast to ratios values close to 1 on the non-snow covered path of travel surfaces.

In step 75, feature extraction is applied to the converted binary image. Feature extraction includes applying a respective statistical analysis for analyzing and identifying features associated with the scattered light on the ground surface. FIG. 11*a* represents the RGB image of the region of interest of a dry surface. As shown in FIG. 11*a*, the respective beam of light is captured as a substantially defined point having essentially a uniform color. In contrast, FIG. 11*b* represents the RGB image of the region of interest of a snow-covered surface. The respective beam of light emitted onto the snow-covered surface is scattered. The respective beam of light is represented as color transitions that change from the center of the light beam to the radial outward scattering of the light beam in the snow. FIGS. 12*a* and 12*b* represent responses for a dry road surface and a snow covered road surface, respectively, after the RBG images are converted into a Lab color space.

FIGS. 13*a* and 13*b* represent binary images converted from Lab images. FIG. 13*a* represents an exemplary dry surface and FIG. 13*b* represents an exemplary snow covered surface. As seen from the binary images, a set of features can readily be extracted based on a mean variance analysis at the region of interest and total area. An intensity mean ratio can be determined between the light region and the total area. A ratio larger than 1 indicates snow, whereas a ratio close to 1 indicates a dry surface.

In step 76, a classifier is constructed based on the results in step 75. Respective features representing sample distributions are plotted in feature space. An example of a classifier may include a support vector machine; however, other techniques may be utilized without deviating from the scope of the invention. The classifier is trained utilizing feature extraction to build a road surface patterns database in step 77. Feature extraction includes extracting features from various images to generate a pattern database. Once the road surface patterns database is constructed, the patterns database can be implemented online in a vehicle in production.

Step 78-82 relate to real-time processing of captured images in analyzing images in the vehicle. These respective steps are the same as steps 70-74 as described above, except that the processing relates to analyzing real-time images as opposed to training the classifier.

In step 83, feature calculation is performed in real time where known features are calculated based on new image inputs.

In step 84, the extracted features based on the binary converted image are provided to an online classifier to analyze the presence of snow in the region of interest.

In step 85, a determination is made whether snow is detected on the road surface. If the determination is made that snow is present on the road surface, then the routine proceeds to step 86; otherwise, the routine proceeds to step 87.

In step 86, in response to a determination that snow is present on the road surface, a snow covered surface indicator flag is set indicating that snow is present in the region of interest. A signal is communicated to a controller where various vehicle operations as described earlier can be actuated that include, but are not limited to, braking control, traction control, speed control, steering control, driver warning, air baffle control, and vehicle to vehicle communication.

If the determination was made in step 85 before that snow is not present in the region of interest, then the routine proceeds to step 87 where other additional techniques may be utilized to verify whether snow is present or not.

Figure 14:
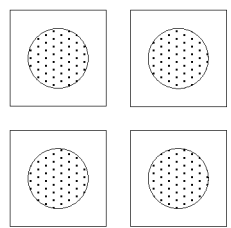
FIG. 14 illustrates an exemplary pattern resembling a square where 4 light spots form a square pattern.
Figure 15:
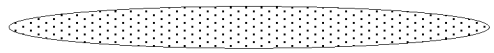
FIG. 15 illustrates an exemplary line pattern where the line spot is elongated resembling an oval pattern.
Figure 16:
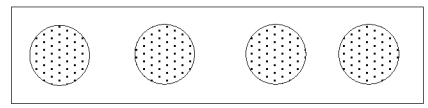
FIG. 16 illustrates a line pattern for each light spot is formed linearly displaced from one another.

FIG. 14-16 illustrated enhanced structured light patterns emitted by the light emitting device. The light source may form a desired structured light pattern instead of a single light spot to cover more surface area and enhance detection reliability and robustness. FIG. 14 illustrates a pattern resembling a square where 4 light spots form a square pattern. FIG. 15 illustrates a line pattern where the line spot is elongated resembling an oval pattern. FIG. 16 illustrates a line pattern for each light spot is formed linearly displaced from one another.

Figure 17:
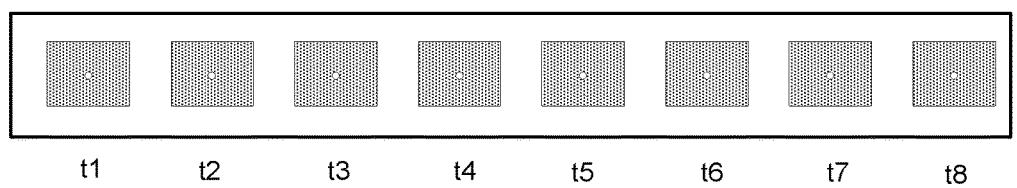
FIG. 17 represents an exemplary real time tracking sequence for a non-snowy surface.
Figure 18:
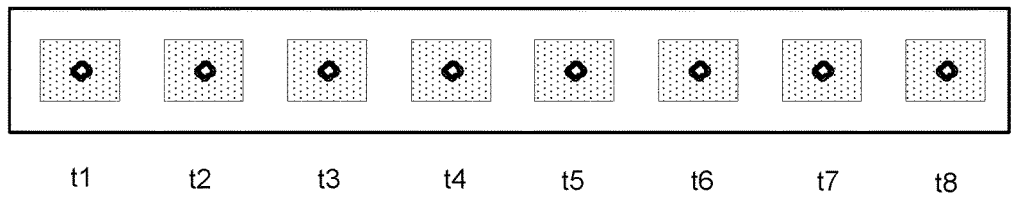
FIG. 18 represents an exemplary real time tracking sequence for a snow-covered surface.

In addition, enhanced analysis may be performed with image tracking analysis where images are tracked consecutively in real time. A determination of the status condition of the road surface is based on analysis of a sequence of images within a moving temporal window frame, instead of an individual image at a single time. The moving window can have different sizes and can be reset at different time instances. The moving window reduces noise and provides a higher confidence level of correct surface identification. FIG. 17 represents an exemplary sequence illustrating a non-snowy surface whereas FIG. 18 represents an image sequence on a snow-covered surface. In each of the figures a respective number of time instances may be sampled for determining whether snow is present on the road surface.

While certain embodiments of the present invention have been described in detail, those familiar with the art to which this invention relates will recognize various alternative designs, filtering process and embodiments for practicing the invention as defined by the following claims.

What is claimed is:

1. A method for determining a snow covered surface condition of a path of travel, the method comprising:
   emitting a beam of light, by a light emitting source, at a surface of the path of travel;
   capturing an image of the surface, by an image capture device mounted on the vehicle, in a downward direction relative to the vehicle, wherein the captured image captures the emitted beam of light;
   identifying a region of interest in the captured image having the captured emitted beam of light
   analyzing, in the region of interest by a processor, a subsurface scattering of the emitted beam of light on the surface, including converting image components to Lab color space to separate color components from lightness components of the captured emitted beam of light, and applying feature extraction to at least one color component in the Lab color space using a filtering technique to detect edges in the region of interest;
   identifying the snow covered surface condition in the region of interest by applying binary conversion to the Lab color space; and
   generating a snow covered path of travel surface signal in response to identifying the snow covered surface condition.

2. The method of claim 1, wherein the filtering technique includes Laplacian of Gaussian filtering.

3. The method of claim 2, wherein a broad blurring pattern of diffused light representing the snow covered surface condition is determined when the filter response indicates peaks that are relatively larger in comparison to filter response data from a non-snow covered path of travel.

4. The method of claim 1, further comprising:
   generating a separation plane based on an offline classifier, wherein the separation plane is implemented within the processor of the vehicle;
   determining a feature value in a feature space based on features extracted from a real image, the real image being the image captured by the image capture device; and comparing the determined feature value in the feature space to the separation plane to identify the snow covered surface condition.

5. The method of claim 4, further comprising:
generating a path of travel surface pattern database as a function of the offline classifier.

6. The method of claim 1, wherein the binary conversion converts pixels representing the identified snow covered surface condition to a patterned space and pixels representing a non snow covered surface condition to a non-patterned space.

7. The method of claim 6, wherein a mean ratio and a variance ratio between the light scattered region and a total region of interest on the binary image include values larger than 1 in contrast to ratios values close to 1 on the non-snow covered surface condition.

8. The method of claim 1, wherein emitted beam of light includes a beam of light emitted from a laser LED.

9. The method of claim 1, wherein the emitted beam of light includes a beam of light emitted from a colored laser LED.

10. The method of claim 1, wherein the emitted beam of light at the surface of the path of travel includes a single beam of light.

11. The method of claim 1, wherein the emitted beam of light at the surface of the path of travel includes square pattern beams of light.

12. The method of claim 1, wherein the emitted beam of light at the surface of the path of travel includes a line pattern beam of light, wherein the line pattern beam of light is an elongated pattern emitted on the path of travel surface.

13. The method of claim 1, wherein the emitted beam of light at the surface of the path of travel includes a plurality of light beams that are linearly displaced from one another.

14. The method of claim 1, wherein:
the emitted beam of light at the surface of the path of travel is consecutively tracked in real time by the processor;
a sequence of images within a moving temporal frame are tracked by the processor to identify the beam of light in each respective temporal frame; and
a moving window is used by the processor to compare a plurality of emitted light beams to identify the snow covered surface condition.

15. The method of claim 1, wherein capturing the image includes capturing a real downward image of the surface.

16. The method of claim 1, further comprising:
providing the generated snow covered path of travel surface signal to a controller of the vehicle; and
autonomously actuating vehicle braking via the controller for mitigating condensation build-up on brakes of the vehicle.

17. The method of claim 1, further comprising:
providing the generated snow covered path of travel surface signal to a controller of the vehicle; and
autonomously actuating a traction control system via the controller for mitigating condensation build-up on brakes of the vehicle.

18. The method of claim 1, further comprising:
providing the generated snow covered path of travel surface signal to a wireless communication system, the signal alerting other vehicles of the snow covered surface condition.

19. The method of claim 1, wherein the generated snow covered path of travel surface signal alerts a driver of the vehicle of a potential reduced traction between vehicle tires and the surface.

20. The method of claim 1, wherein the generated snow covered path of travel surface signal alerts a driver of the vehicle against a use of cruise control.

21. The method of claim 1, wherein the generated snow covered path of travel surface signal alerts a driver of the vehicle against a use of automated features.

22. The method of claim 1, further comprising:
providing the generated snow covered path of travel surface signal to a controller of the vehicle;
autonomously modifying a control setting of an automated control feature, via the controller, in response to the snow covered surface condition.

23. The method of claim 1, further comprising:
providing the generated snow covered path of travel surface signal to a controller of the vehicle; and
autonomously disabling cruise control via the controller.

24. The method of claim 1, wherein the generated snow covered path of travel surface signal alerts a driver to reduce a speed of the vehicle.

25. The method of claim 1, wherein the generated snow covered path of travel surface signal is provided to a controller of the vehicle for shutting baffles on an air intake scoop of the vehicle for preventing snow ingestion.

26. The method of claim 1, further comprising:
providing the generated snow covered path of travel surface signal to a controller of the vehicle;
shutting baffles on an air intake scoop of the vehicle via the controller the thereby prevent snow ingestion.

27. A method for determining a snow covered surface condition of a path of travel, the method comprising:
emitting a beam of light, by a light emitting source, at a surface of the path of travel;
capturing an image of the surface, by an image capture device, in a downward direction relative to the vehicle, the captured image capturing the emitted beam of light;
identifying a region of interest in the captured image that includes the emitted beam of light;
analyzing, by a processor in the region of interest, a subsurface scattering of the emitted beam of light on the surface, including converting image components to Lab color space to separate color components from lightness components of the captured beam of light, and applying feature extraction to at least one color component in the Lab color space using a filtering technique to detect edges in the region of interest, the filtering technique including Laplacian of Gaussian filtering in which a respective number of Laplacian of Gaussian filters having different scales are applied to filter color components of the scattered light beam in the image to generate a filter response;
identifying the snow covered surface condition in the region of interest; and
generating a snow covered path of travel surface signal in response to identifying the snow covered surface condition.

28. A method for determining a snow covered surface condition of a path of travel, the method comprising:
emitting a beam of light, by a light emitting source, at a surface of the path of travel;
capturing an image of the surface, by an image capture device mounted on the vehicle, in a downward direction relative to the vehicle, the captured image capturing the emitted beam of light;
identifying a region of interest in the captured image that includes the emitted beam of light;
analyzing, by a processor in the region of interest, a subsurface scattering of the emitted beam of light on the surface, including converting image components to Lab color space to separate color components from lightness components of the captured beam of light, and applying feature extraction to at least one color component in the Lab color space using a filtering technique to detect edges in the region of interest;
identifying the snow covered surface condition in the region of interest, including:
generating a separation plane via the processor based on an offline classifier;
determining a feature value based on features extracted from a real image captured by the image capture device;
comparing the feature value in the feature space relative to the separation plane to identify the snow covered surface condition; and
generating a snow covered path of travel surface signal in response to identifying the snow covered surface condition.

\* \* \* \* \*